United States Patent
Xia et al.

(10) Patent No.: US 11,424,893 B2
(45) Date of Patent: Aug. 23, 2022

(54) ACK/NACK REPORTING METHOD, APPARATUS AND DEVICE AND STORAGE MEDIUM

(71) Applicants: China Mobile Communication Co., Ltd Research Institute, Beijing (CN); China Mobile Communications Group Co., Ltd., Beijing (CN)

(72) Inventors: Liang Xia, Beijing (CN); Xiaodong Xu, Beijing (CN); Yuhong Huang, Beijing (CN); Guangyi Liu, Beijing (CN)

(73) Assignees: CHINA MOBILE COMMUNICATION CO., LTD RESEARCH INST., Beijing (CN); CHINA MOBILE COMMUNICATIONS GROUP CO., LTD., Beijing (CN)

(*) Notice: Subject to any disclaimer, the term of this patent is extended or adjusted under 35 U.S.C. 154(b) by 237 days.

(21) Appl. No.: 16/764,649

(22) PCT Filed: Sep. 5, 2018

(86) PCT No.: PCT/CN2018/104234
§ 371 (c)(1),
(2) Date: May 15, 2020

(87) PCT Pub. No.: WO2019/095799
PCT Pub. Date: May 23, 2019

(65) Prior Publication Data
US 2020/0389276 A1    Dec. 10, 2020

(30) Foreign Application Priority Data
Nov. 17, 2017 (CN) .......................... 201711148634.1

(51) Int. Cl.
*H04L 5/00* (2006.01)
*H04L 5/14* (2006.01)

(52) U.S. Cl.
CPC .......... *H04L 5/0055* (2013.01); *H04L 5/0005* (2013.01); *H04L 5/0094* (2013.01); *H04L 5/1469* (2013.01)

(58) Field of Classification Search
None
See application file for complete search history.

(56) References Cited

U.S. PATENT DOCUMENTS

| 2012/0099491 A1 | 4/2012 | Lee |
| 2013/0044653 A1 | 2/2013 | Yang et al. |

(Continued)

FOREIGN PATENT DOCUMENTS

| WO | 2016/108658 A1 | 7/2016 |
| WO | 2016/184211 A1 | 11/2016 |
| WO | 2017/162008 A1 | 9/2017 |

OTHER PUBLICATIONS

"Downlink HARQ-ACK feedback timing," 3GPP TSG RAN WG1 Meeting #88bis, Apr. 7, 2017, sections 1-3.

(Continued)

*Primary Examiner* — Saumit Shah
(74) *Attorney, Agent, or Firm* — Syncoda LLC; Feng Ma (57) ABSTRACT

Disclosed are an Ack/NACK reporting method and apparatus, a device and a storage medium. The method comprises: a UE determining, according to signaling sent by a base station, a time-domain position for reporting ACK/NACK corresponding to PDSCH transmission; and the UE reporting, at the time-domain position for reporting ACK/NACK, M pieces of ACKs/NACK which satisfy a definition condition and corresponding to the PDSCH transmissions, where M is an integer greater than 0.

18 Claims, 3 Drawing Sheets

---

UE determines, according to signaling sent by a base station, a time-domain position for ACK/NACK reporting of one or more PDSCH transmissions — S201

The UE reports ACKs/NACKs of M PDSCH transmissions meeting a limiting condition at the time-domain position for ACK/NACK reporting — S202

(56) References Cited

U.S. PATENT DOCUMENTS

| | | | |
|---|---|---|---|
| 2017/0366323 A1 | 12/2017 | Ahn et al. | |
| 2018/0145796 A1 | 5/2018 | Liang et al. | |
| 2019/0109692 A1* | 4/2019 | Gao | H04L 1/18 |
| 2019/0159251 A1* | 5/2019 | Li | H04L 1/18 |
| 2020/0036489 A1* | 1/2020 | Wang | H04L 1/1861 |
| 2020/0128542 A1* | 4/2020 | Tang | H04W 72/0453 |

OTHER PUBLICATIONS

"On the open aspects of HARQ management," 3GPP TSG RAN WG1 NR Ad-Hoc #3, Sep. 21, 2017.
"On CBG based transmissions," 3GPP TSG-RAN WG1 NR AH #3, Sep. 21, 2017.
"HARQ Management and Feedback," 3GPP TSG RAN WG1 Meeting NR#3, Sep. 21, 2017.
International Search Report in PCT International Application No. PCT/CN2018/104234, dated Nov. 28, 2018.
Written Opinion of the International Search Authority in PCT International Application No. PCT/CN2018/104234, dated Nov. 28, 2018.
Supplementary European Search Report dated Nov. 19, 2020 in corresponding European Patent Application No. 18878718.8.
"On NR carrier aggregation," 3GPP TSG RAN WG1 Meeting #90bis, R1-1717505, vivo, Oct. 9-13, 2017.
"HARQ-ACK codebook determination," 3GPP TSG RAN WG1 Meeting #90, R1-1713645, Samsung, Aug. 21-25, 2017.
"HARQ-ACK payload adaptation for Rel-13 CA," 3GPP TSG RAN WG1 Meeting #83, R1-156850, LG Electronics, Nov. 15-22, 2015.

* cited by examiner

ACK/NACK REPORTING METHOD, APPARATUS AND DEVICE AND STORAGE MEDIUM

CROSS-REFERENCE TO RELATED APPLICATION

The present application is a U.S. National Phase of PCT International Application No. PCT/CN2018/104234 with an International Filing Date of Sep. 5, 2018, which claims under 35 USC § (a) the benefit of Chinese Patent Application No. 201711148634.1, filed on Nov. 17, 2017, the entire contents of which are incorporated by reference herein.

TECHNICAL FIELD

The application relates, but not limited to, a 5th-Generation (5G) New Radio (NR) technology, and particularly to an Acknowledgement (ACK)/Negative Acknowledgement (NACK) reporting method, apparatus and device and a storage medium.

BACKGROUND

In a 5G NR system, a design of a flexible frame structure is adopted, namely a format (for example, Uplink (UL), Downlink (DL) and unknown) of each sub-frame is configured by a base station through high-layer signaling and/or dynamic signaling, unknown referring to that UL or DL is not explicitly indicated in a frame structure configuration message sent by the base station. Therefore, an ACK/NACK feedback time sequence of a Physical Downlink Shared Channel (PDSCH) may be more flexible and variable. Therefore, there is a need for a solution to a problem about ACK/NACK feedback in a flexible frame structure.

SUMMARY

In view of this, embodiments of the application provide an ACK/NACK reporting method, apparatus and device and a storage medium.

The technical solutions of the embodiments of the application are implemented as follows.

The embodiments of the application provide an ACK/NACK reporting method, which may include the following operations.

A User Equipment (UE) determines, according to signaling sent by a base station, a time-domain position for ACK/NACK reporting of one or more PDSCH transmissions.

The UE reports ACKs/NACKs of M PDSCH transmissions meeting a limiting condition at the time-domain position, M being an integer greater than 0.

The embodiments of the application also provide an ACK/NACK receiving method, which may include the following operations.

A base station sends signaling to a UE, the signaling being configured to determine a time-domain position for ACK/NACK reporting of one or more a PDSCH transmissions.

The base station receives ACKs/NACKs reported by the UE, the ACKs/NACKs of M PDSCH transmissions meeting a limiting condition.

The embodiments of the application also provide an ACK/NACK reporting apparatus, which may include a first determination unit and a reporting unit.

The first determination unit may be configured to determine, according to signaling sent by a base station, a time-domain position for ACK/NACK reporting of one or more PDSCH transmissions.

The reporting unit may be configured to report ACKs/NACKs of M PDSCH transmissions meeting a limiting condition at the time-domain position, M being an integer greater than 0.

The embodiments of the application also provide an ACK/NACK receiving apparatus, which may include a sending unit and a receiving unit.

The sending unit may be configured to send signaling to UE, the signaling being configured to determine a time-domain position for ACK/NACK reporting of one or more a PDSCH transmission.

The receiving unit may be configured to receive ACKs/NACKs reported by the UE, the ACKs/NACKs of M PDSCH transmissions meeting a limiting condition.

The embodiments of the application also provide an ACK/NACK reporting device, which may include a memory and a processor. The memory may store computer programs capable of running in the processor. The processor may execute the programs to implement the steps in the ACK/NACK reporting method.

The embodiments of the application also provide a computer-readable storage medium, in which computer programs may be stored, the computer programs being executed by a processor to implement the steps in the ACK/NACK reporting method.

According to the ACK/NACK reporting method, apparatus and device and storage medium provided in the embodiments of the application, since a sub-frame format of 5G NR is more flexible, the number of PDSCH transmission sub-frames of ACKs/NACKs carried in an (n+k1)th sub-frame is unpredictable and a numerical value is more variable, for adaptation to flexibility and variability of NR, in the technical solutions provided in the embodiments of the application, the limiting condition is set for ACK/NACK reporting of PDSCH transmissions, and the ACKs/NACKs of the M PDSCH transmissions from ACKs/NACKs of the M' PDSCH transmissions are reported according to the limiting condition. However, various limiting conditions may be set, for example, a time interval related limiting condition and a transmission moment related limiting condition. In other words, according to the embodiments of the application, the limiting condition for the M PDSCH transmissions of ACK/NACK feedback is set for adaptation to flexibility and variability of NR.

DETAILED DESCRIPTION

A Physical Downlink Control Channel (PDCCH) may be configured to indicate scheduling indication information, such as a time-frequency resource, transmission parameter and the like, of a PDSCH corresponding to UE, and the information is contained in a Downlink Control Indicator (DCI). The UE is required to detect the PDCCH at first and receive the PDSCH according to the DCI in the PDCCH. If the UE correctly receives the PDSCH, the UE is required to report an ACK to a base station, otherwise the UE is required to report a NACK to the base station. The base station judges, according to the ACK/NACK reported by the UE, whether data information contained in the PDSCH transmission is required to be retransmitted or not.

In a Long Term Evolution (LTE) Time Division Duplexing (TDD) system, an ACK/NACK reported by the UE in an nth sub-frame is determined by a PDSCH received by the UE in an (n−k)th sub-frame, a numerical value of k being determined by the following Table 1.

TABLE 1

| UL-DL config- | Sub-frame n | | | | | | | | | |
|---|---|---|---|---|---|---|---|---|---|---|
| uration | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

As shown in Table 1, in TDD sub-frame configurations 1 to 6, the number of UL sub-frames is smaller than that of DL sub-frames, and consequently, ACKs/NACKs of multiple PDSCH transmissions are reported in the same UL sub-frame.

An ACK/NACK resource for DL Semi-Persistent Scheduling (SPS) will be introduced below. A fixed timing relationship, for example, n+k, is adopted in a time domain. In a frequency domain, a base station configures four available Physical Uplink Control Channel 1 (PUCCH1) resources for UE through n1 PUCCH-AN-PersistentList of SPS-ConfigDL, and a Transmit Power Control (TPC) command for PUCCH field in a DCI instructs one of the four PUCCH1 resources to be selected for returning an ACK/NACK.

Figure 1:
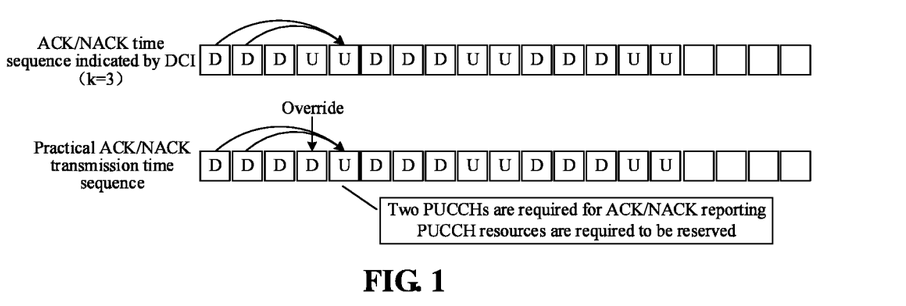
FIG. 1 is a schematic diagram of an ACK/NACK reporting position.

A fixed timing relationship (n+k) is adopted for PDSCH-ACK/NACK in an LTE Frequency Division Duplexing (FDD)/TDD system. As shown in FIG. 1, in dynamic scheduling of NR, a time-domain resource (k) for an ACK/NACK is dynamically indicated through a DL DCI. Resources (n+k) indicated in the DCI may be changed (overridden) from UL resources to DL resources by information such as a Slot Format Indicator (SFI). If they are overridden, the ACK/NACK may be reported after a delay, but another ACK/NACK may also be required to be reported in a slot where the ACK/NACK is reported after the delay. Consequently, there may not be enough PUCCH resources, or a PUCCH resource conflict or PUCCH resource waste may be brought.

In 5G NR, when UE receives a PDSCH in an nth sub-frame, the UE reports an ACK/NACK in an (n+k1)th sub-frame, k1 being configured by a base station through high-layer signaling and/or a DCI or being predefined. Since a sub-frame format of 5G NR may change flexibly, there may be such a case that the number of UL sub-frames is relatively small, and when the (n+k1)th sub-frame arrives, the UE may be required to report ACKs/NACKs of multiple PDSCH transmissions in this sub-frame. The sub-frame format of 5G NR is more flexible, the number of PDSCH transmission sub-frames of ACKs/NACKs carried in the (n+k1)th sub-frame is unpredictable, and the numerical value is more variable, so there is a need for a solution to a problem about bundling-based ACK/NACK feedback in a flexible frame structure.

The technical solutions of the application will further be elaborated below in combination with the drawings and the embodiments.

The embodiments disclose an ACK/NACK reporting method. The method is applied to UE. A function realized by the method may be realized by calling program codes through a processor in the UE. Of course, the program codes may be stored in a computer storage medium. It can be seen that the UE at least includes the processor and the storage medium.

Figure 2:
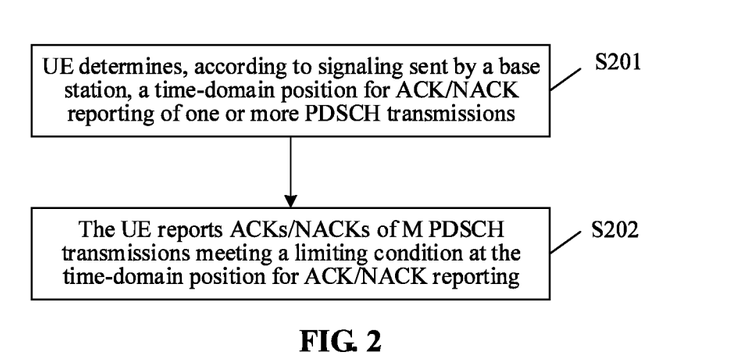
FIG. 2 is an implementation flowchart of an ACK/NACK reporting method according to an embodiment of the application.

FIG. 2 is an implementation flowchart of an ACK/NACK reporting method according to an embodiment of the application. As shown in FIG. 2, the method includes the following steps.

In S201, UE determines, according to signaling sent by a base station, a time-domain position for ACK/NACK reporting of a PDSCH transmission.

Herein, the base station sends the signaling to the UE, the signaling being configured to determine the time-domain position for ACK/NACK reporting of the PDSCH transmission.

Herein, the signaling sent by the base station may be implemented through a DCI and/or an SFI, etc.

In an implementation process, the time-domain position for ACK/NACK reporting is a first slot or mini-slot, more than or equal to n+k, available for transmission or reporting of the ACK/NACK. n is a slot or mini-slot where a PDSCH is received, or n is a last slot or mini-slot where the PDSCH is received. k is a numerical value indicated by the base station through high-layer signaling and/or DL control signaling, and/or k is predefined, and/or k is determined according to n. Slots or mini-slots available for ACK/NACK transmission include a UL slot or mini-slot, an undetermined slot or mini-slot and a DL slot or DL mini-slot except that indicated by dynamic signaling. The UL slot refers to a slot or mini-slot of which a transmission direction is determined to be UL by the UE through broadcast signaling, high-layer signaling and/or dynamic signaling sent by the base station before the slot arrives or before a specific moment before the slot arrives. The undetermined slot or mini-slot refers to a slot or mini-slot of which a transmission direction may not be determined by the UE before the slot or mini-slot arrives or before a specific moment before the slot or mini-slot arrives. Or, the undetermined slot or mini-slot refers to a slot or mini-slot that a transmission direction is not explicitly indicated to be UL or DL in a slot configuration message sent by the base station.

In S202, the UE reports ACKs/NACKs of M PDSCH transmissions meeting a limiting condition at the time-domain position for ACK/NACK reporting, M being an integer greater than 0.

Herein, the limiting condition may include a condition related to at least one of: PDSCH transmission moment, ACK/NACK reporting moment, a time interval and a number, the time interval being an interval between the PDSCH transmission moment and the ACK/NACK reporting moment. In an implementation process, a time interval threshold value and a number threshold value may be involved. For example, the time interval is less than the time interval threshold value, or the time interval is in a certain threshold value interval, and the number is less than the number threshold value.

Herein, the base station receives the ACKs/NACKs reported by the UE, the ACKs/NACKs of the M PDSCH transmissions meeting the limiting condition and M being an integer greater than 0.

In another embodiment, the ACKs/NACKs of the M PDSCH transmissions may be reported at the same time-domain position. M is an integer greater than 0 and less than or equal to M'.

In another embodiment, before S201, the method further includes the following step. In S200, the UE determines the limiting condition for PDSCH transmissions of ACK/NACK reporting. In another embodiment, S200 may also be as follows: the UE determines the limiting condition for the PDSCH transmissions of ACK/NACK reporting and a limiting parameter of M' PDSCH transmissions. The limiting parameter is a parameter of a dimension corresponding to the limiting condition. If the limiting condition is related to the time interval threshold value, the limiting parameter is the time interval. If the limiting condition is related to the number threshold value, the limiting parameter is the number.

In the embodiment, if the time-domain position for ACK/NACK reporting of the PDSCH transmission is a resource (for example, a UL slot) available for ACK/NACK transmission, the UE reports, an ACK/NACK of the PDSCH transmission and an unreported ACK/NACK of a PDSCH transmitted in time T before the PDSCH transmission, at the time-domain position. ACKs/NACKs of multiple PDSCH transmissions may be merged for reporting, namely one or more ACKs/NACKs are determined according to the ACKs/NACKs of the multiple PDSCH transmissions for reporting. If the time-domain position for ACK/NACK reporting of the PDSCH transmission is overridden, the ACK/NACK may be reported after a delay, namely the ACK/NACK is reported in a first available UL slot after n+k.

Figure 3:
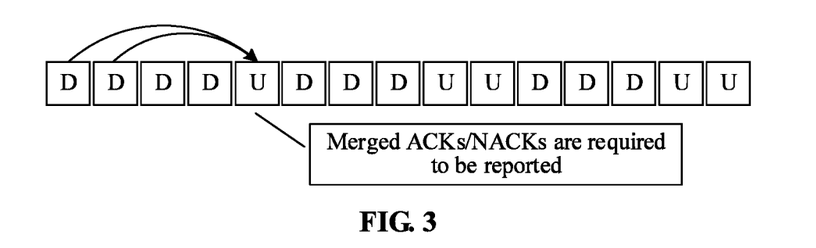
FIG. 3 is a schematic diagram of an ACK/NACK reporting position according to an embodiment of the application.

The UE determines a frequency-domain resource position of a PUCCH configured to report the ACK/NACK according to one (for example, first or last) PDSCH transmission in the M PDSCH transmissions or a corresponding PDCCH or a corresponding DCI. Referring to FIG. 3, one PUCCH is required to report the merged ACK/NACKs, and a PUCCH resource corresponding to the second PDSCH transmission is used.

Since a sub-frame format of 5G NR is more flexible, the number of PDSCH transmission sub-frames of ACKs/NACKs carried in an (n+k1)th sub-frame is unpredictable and a numerical value is more variable, for adaptation to flexibility and variability of NR, in the technical solution provided in the embodiment of the application, the limiting condition is set for ACK/NACK reporting of PDSCH transmissions, and the ACKs/NACKs of the M PDSCH transmissions in the ACKs/NACKs of M' PDSCH transmissions are reported according to the limiting condition. However, various limiting conditions may be set, for example, a time interval related limiting condition and a transmission moment related limiting condition. In other words, according to the embodiments of the application, based on flexibility of NR, the limiting condition related to the number M of the feedback PDSCH transmissions rather than the time-domain position for ACK feedback is preset.

Several limiting conditions will be described below.

First: the limiting condition includes a maximum number M_max of PDSCH transmissions of which ACK/NACK are reported, and the operation that the UE determines the limiting condition for the PDSCH transmissions of ACK/NACK reporting includes that: the UE determines the maximum number M_max of the PDSCH transmissions of which ACK/NACK are reported, M_max being an integer greater than 0.

The operation that the UE reports the ACKs/NACKs of the M PDSCH transmissions meeting the limiting condition at the time-domain position for ACK/NACK reporting includes that: the UE reports the ACKs/NACKs of the M PDSCH transmissions at the time-domain position for ACK/NACK reporting, where M is less than or equal to M_max.

In another embodiment, the method further includes that: if the number M' of the PDSCH transmissions requiring ACK/NACK reporting at the time-domain position for ACK/NACK reporting is less than or equal to M_max, it is determined that the value of M to be equal to M'; and if M' is greater than M_max, it is determined that the value of M to be equal to M_max, and ACKs/NACKs of M_max PDSCH transmissions from ACKs/NACKs of the M' PDSCH transmissions are determined as the ACKs/NACKs of the M PDSCH transmissions.

In another embodiment, the operation that the UE determines the maximum number M_max of the PDSCH transmissions of which ACK/NACK are reported includes that: the UE determines M_max through configuration signaling of the base station; or, the UE determines M_max through at least one of a Hybrid Automatic Repeat reQuest (HARQ) process number, a PDSCH processing delay, an ACK/NACK processing delay or a UL slot proportion.

In the embodiment, the limiting condition M_max is set, so that a method of determining the ACKs/NACKs of the M_max PDSCH transmissions in the M' PDSCH transmissions for reporting is provided. In an implementation process, M_max may also be combined with the PDSCH transmission moment. For example, the ACKs/NACKs of M_max PDSCH transmissions of which transmission moments are later in ACKs/NACKs of M' PDSCH transmissions are reported, or, the ACKs/NACKs of M_max PDSCH transmissions of which transmission moments are earlier in ACKs/NACKs of M' PDSCH transmissions are reported, or, the ACKs/NACKs of M_max PDSCH transmissions of which transmission moments are discrete in ACKs/NACKs of M' PDSCH transmissions are reported. There is made such a hypothesis that M' is 5, M_max is 3 and there are totally 5 moments for the 5 PDSCH transmissions, for example, $t_{p1}$, $t_{p2}$, $t_{p3}$, $t_{p4}$ and $t_{p5}$, the transmission moment of the first PDSCH transmission being $t_{p1}$ and, by parity of reasoning, the transmission moment of the fifth PDSCH transmission being $t_{p5}$, where $t_{p1}$ is earlier than $t_{p2}$, $t_{p2}$ is earlier than $t_{p3}$, $t_{p3}$ is earlier than $t_{p4}$, and $t_{p4}$ is earlier than $t_{p5}$. Since M'=5 is greater than M=3, during reporting, only ACKs/NACKs of M=3 PDSCH transmissions from M'=5 PDSCH transmissions may be selected for reporting. For example, the ACKs/NACKs of the PDSCH transmissions of which the transmission moments correspond to $t_{p3}$, $t_{p4}$ and $t_{p5}$ may be reported, or the ACKs/NACKs of the PDSCH transmissions of which the transmission moments correspond to $t_{p1}$, $t_{p2}$ and $t_{p3}$ may be reported, or the ACKs/NACKs of the PDSCH transmissions of which the transmission moments correspond to $t_{p1}$, $t_{p3}$ and $t_{p5}$ may be reported.

Second: the limiting condition includes at least one of a maximum time interval T_max or a minimum time interval T_min. The operation that the UE reports the ACKs/NACKs of the M PDSCH transmissions meeting the limiting condition at the time-domain position for ACK/NACK reporting includes that: it is determined that a time interval between the transmission moment of each of the M PDSCH transmissions and a moment of the time-domain position for ACK/NACK reporting meets at least one of the following conditions: being not greater than T_max, or being not less than T_min, or being not greater than T_max and being not less than T_min, T_min being less than or equal to T_max.

The limiting condition includes at least one of the maximum time interval T_max or the minimum time interval T_min. The operation that the UE reports the ACKs/NACKs of the M PDSCH transmissions meeting the limiting condition at the time-domain position for ACK/NACK reporting includes that: time intervals between transmission moments of the M' PDSCH transmissions and the moment of the time-domain position for ACK/NACK reporting are determined; and the ACKs/NACKs of the M PDSCH transmissions of which the time intervals are not greater than T_max, or not less than T_min or not greater than T_max and not less than T_min in the M' PDSCH transmissions are reported at the time-domain position for ACK/NACK reporting.

Since the sub-frame format of 5G NR may change flexibly, there may be such a condition that the number of UL sub-frames is relatively small, and when the (n+k1)th sub-frame arrives, the UE may be required to report ACKs/NACKs of multiple PDSCH transmissions in this sub-frame. For reducing an ACK/NACK reporting overhead and improving ACK/NACK transmission reliability, a bundling-based ACK/NACK feedback method may still be adopted. Generally speaking, there are totally M' transmission moments for the M' PDSCH transmissions, for example, $t_{p1}$, $t_{p2}$, $t_{p3}$ to $t_{pM'}$, and when the bundling-based ACK/NACK feedback method is adopted, there is only one moment $t_a$ of the time-domain position for ACK/NACK reporting, so that each PDSCH transmission in the M' PDSCH transmissions corresponds to one time interval, the time intervals of the M' PDSCH transmissions being $T_{p1}$, $T_{p2}$ to $T_{pM'}$ respectively. After the time intervals of the M' PDSCH transmissions are calculated, the ACKs/NACKs of the M PDSCH transmissions of which the time intervals are less than or equal to T_max are reported at the time-domain position for ACK/NACK reporting, or, the ACKs/NACKs corresponding to the M PDSCH transmissions of which the time intervals are greater than or equal to T_min are reported at the time-domain position for ACK/NACK reporting, or, the ACKs/NACKs corresponding to the M PDSCH transmissions of which the time intervals are greater than or equal to T_min and less than or equal to T_max are reported at the time-domain position for ACK/NACK reporting. In the embodiment, the limiting condition such as the maximum time interval T_max and the minimum time interval T_min is set, so that a method of determining the ACKs/NACKs of the M PDSCH transmissions from the M' PDSCH transmissions for reporting is provided.

Third: the limiting condition includes a maximum time interval difference T_delta, and the operation that the UE reports the ACKs/NACKs of the M PDSCH transmissions meeting the limiting condition at the time-domain position for ACK/NACK reporting includes that: an effective initial moment for PDSCH transmission is determined according to the maximum time interval difference T_delta and the moment of the time-domain position for ACK/NACK reporting; and the ACKs/NACKs of the M PDSCH transmissions of which the transmission moments are after the effective initial moment are reported.

The limiting condition includes the maximum time interval difference T_delta, and the operation that the UE reports the ACKs/NACKs of the M PDSCH transmissions meeting the limiting condition at the time-domain position for ACK/NACK reporting includes that: the effective initial moment for PDSCH transmission is determined according to the maximum time interval difference T_delta and the moment of the time-domain position for ACK/NACK reporting; and the ACKs/NACKs of the M PDSCH transmissions of which the transmission moments are after the effective initial moment in the M' PDSCH transmissions are reported.

As mentioned above, there are totally M' transmission moments for the M' PDSCH transmissions, for example, $t_{p1}$, $t_{p2}$, $t_{p3}$ to $t_{pM'}$, and when the bundling-based ACK/NACK feedback method is adopted, there is only one moment $t_a$ of the time-domain position for ACK/NACK reporting. Those skilled in the art knows that the moment $t_a$ of the time-domain position for ACK/NACK reporting is later than the PDSCH transmission moment $t_p$, $t_p$ including $t_{p1}$, $t_{p2}$, $t_{p3}$ to $t_{pM'}$, and the maximum time interval difference T_delta is a maximum difference between the PDSCH transmission moment and the moment $t_a$ of the time-domain position for ACK/NACK reporting. Therefore, the effective initial moment $t_b$ for PDSCH transmission may be obtained by subtracting T_delta from the moment $t_a$ of the time-domain position for ACK/NACK reporting, and the ACKs/NACKs of the M PDSCH transmissions of which the transmission moments are after the effective initial moment in the M' PDSCH transmissions are reported.

In another embodiment, M_max, T_max, T_min or T_delta is configured through the configuration signaling of the base station; or, M_max, T_max, T_min or T_delta is determined by the UE or a network side through at least one of the HARQ process number, the PDSCH processing delay, the ACK/NACK processing delay, the UL slot proportion or a maximum bit number for ACK/NACK reporting.

In another embodiment, the operation that the UE reports the ACKs/NACKs of the M PDSCH transmissions meeting the limiting condition at the time-domain position for ACK/NACK reporting includes that: the ACKs/NACKs of the M PDSCH transmissions meeting the limiting condition are reported by use of the bundling-based ACK/NACK feedback method at the time-domain position for ACK/NACK reporting. For example, the UE, for each codeword or Code Block Group (CBG), executes a logical AND operation on ACKs/NACKs of the corresponding codewords or CBGs of the M PDSCH transmissions to obtain N ACKs/NACKs, N being the number or maximum number of the codewords or CBGs comprised in one PDSCH transmission.

Or, the UE divides the M PDSCH transmissions into P groups, and the UE executes the logical AND operation on the ACKs/NACKs of each group of PDSCH transmissions to obtain ACKs/NACKs required to be reported, P being an integer greater than 0 and less than M.

P may be determined by the maximum bit number of the ACKs/NACKs that may be reported. Each group includes Q PDSCH transmissions, Q being an integer not less than $$\frac{M}{P} - 1$$

and not greater than $$\frac{M}{P} + 1.$$

As mentioned above, there are the ACKs/NACKs of totally M' PDSCH transmissions, M PDSCH transmissions are selected from M' PDSCH transmissions according to the limiting condition, and each PDSCH transmission includes N codewords or CBGs, namely the first PDSCH transmission in the M PDSCH transmissions includes N codewords or CBGs, the second PDSCH transmission in the M PDSCH transmissions includes N codewords or CBGs, and by parity of reasoning, the Mth PDSCH transmission in the M PDSCH transmissions includes N codewords or CBGs. In such case, the logical AND operation is executed on the ACKs/NACKs of the first codewords or CBGs in the first to Mth PDSCH transmissions in the M PDSCH transmissions to obtain a first result, the logical AND operation is executed on the ACKs/NACKs of the second codewords or CBGs in the first to Mth PDSCH transmissions in the M PDSCH transmissions to obtain a second result, by parity of reasoning, the logical AND operation is executed on the ACKs/NACKs of the (N−1)th codewords or CBGs in the first to Mth PDSCH transmissions in the M PDSCH transmissions to obtain an (N−b 1)th result, and the logical AND operation is executed on the ACKs/NACKs of the Nth codewords or CBGs in the first to Mth PDSCH transmissions in the M PDSCH transmissions to obtain an Nth result. Therefore, N ACKs/NACKs are obtained.

For reducing the ACK/NACK reporting overhead and improving the ACK/NACK transmission reliability, the bundling-based ACK/NACK feedback method is adopted for an LTE TDD system. A specific method is as follows: an ACK/NACK reported by the UE in an nth sub-frame is determined by ACKs/NACKs of PDSCHs received by the UE in an (n−k)th sub-frame, k∈K and K being a value set of k corresponding to the nth sub-frame, and the UE, for each codeword, executes the logical AND operation on ACKS/NACKS of corresponding codewords of PDSCHs received in all DL sub-frames in the set K to obtain one to two ACKS/NACKS (each PDSCH transmission includes at most two codewords in LTE) and reports them to an Evolved Node B (eNB) in the nth sub-frame.

In another embodiment, the operation that the UE determines the time-domain position for ACK/NACK reporting of the PDSCH transmission according to the signaling sent by the base station includes that: a numerical value k indicated by the signaling sent by the base station is determined; a numerical value n of a last slot or mini-slot for the PDSCH transmission is determined; a first slot or mini-slot, more than or equal to n+k, available for ACK/NACK reporting is determined; and the first slot or mini-slot available for ACK/NACK reporting is determined as the time-domain position for ACK/NACK reporting. The signaling sent by the base station may be implemented through the DCI and/or the SFI, etc.

In another embodiment, slots or mini-slots available for ACK/NACK reporting include a UL slot, a UL mini-slot, an undetermined slot or undetermined mini-slot and a DL slot except that indicated by dynamic signaling.

In another embodiment, the M PDSCH transmissions are implemented through the same carrier or the same frequency-domain resource set. The frequency-domain resource set may be a bandwidth part or consist of at least one sub-band or at least one resource block.

In another embodiment, a PDSCH transmission is implemented in a DL slot, mini-slot or DL sub-frame of a carrier, or a PDSCH transmission is implemented in multiple DL slots, mini-slots or DL sub-frames of a carrier.

Figure 4:
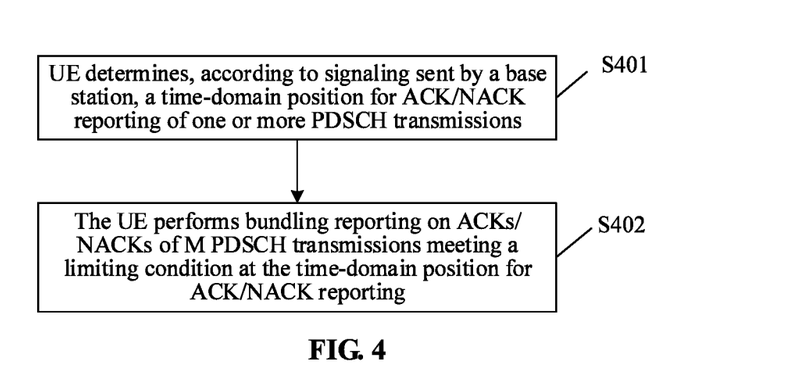
FIG. 4 is an implementation flowchart of an ACK/NACK reporting method according to an embodiment of the application.

For an NR PDSCH ACK/NACK reporting manner, the embodiment discloses a bundling-based ACK/NACK reporting method. FIG. 4 is an implementation flowchart of an ACK/NACK reporting method according to an embodiment of the application. As shown in FIG. 4, the method includes the following steps.

In S401, UE determines a time-domain position for ACK/NACK reporting of one or more PDSCH transmissions according to signaling sent by a base station.

Information sent by the base station may be configuration signaling.

In another embodiment, the time-domain position for ACK/NACK reporting is a first slot or mini-slot, more than or equal to n+k, available for ACK/NACK transmission, n being a last slot or mini-slot where the PDSCH transmission is received and k being a numerical value indicated by the base station through high-layer signaling and/or DL control signaling.

Slots or mini-slots available for ACK/NACK transmission include a UL slot or mini-slot and an undetermined slot or mini-slot. The UL slot refers to a slot or mini-slot of which a transmission direction is determined to be UL by the UE through broadcast signaling, high-layer signaling and/or dynamic signaling sent by the base station before the slot arrives or before a specific moment before the slot arrives. The undetermined slot or mini-slot refers to a slot or mini-slot of which a transmission direction may not be determined by the UE before the slot or mini-slot arrives or before a specific moment before the slot or mini-slot arrives. The dynamic signaling includes a DCI and/or an SFI, etc.

In S402, the UE performs bundling reporting on ACKs/NACKs of M PDSCH transmissions meeting a limiting condition at the time-domain position for ACK/NACK reporting, M being a positive integer.

The ACKs/NACKs of the M PDSCH transmissions are reported at the same time-domain positions, or, the ACKs/NACKs of the M PDSCH transmissions are reported at the same time-domain position through the same carrier, or, the ACKs/NACKs of the M PDSCH transmissions are reported at the same time-domain position through the same frequency-domain resource set. The frequency-domain resource set may be a bandwidth part or consist of at least one sub-band or at least one resource block.

In another embodiment, the UE, for each codeword or CBG, executes a logical AND operation on ACKs/NACKs of corresponding codewords or CBGs of multiple PDSCH transmissions to obtain N ACKs/NACKs, N being the number of codewords or CBGs in a PDSCH transmission.

In another embodiment, M is a positive integer not greater than M_max, M_max being configured by the base station through the high-layer signaling or determined according to at least one of factors such as a HARQ process number, PDSCH and/or ACK/NACK processing delays, or a UL slot proportion.

For example, if ACKs/NACKs of M' PDSCH transmissions appear at the time-domain position for ACK/NACK reporting, M'>M_max, the UE selects the ACKs/NACKs of M_max PDSCH transmissions for bundling reporting. For example, the UE selects the ACKs/NACKs of the last M_max PDSCH transmissions in the M PDSCH transmissions for bundling reporting.

In another embodiment, first time intervals between transmission moments of the M PDSCH transmissions and the time-domain position for ACK/NACK reporting are not greater than T_max and/or the first time intervals are not less than T_min, where T_max and/or T-min is/are configured by the base station through the high-layer signaling or determined according to at least one of factors such as the HARQ process number, the PDSCH and/or ACK/NACK processing delays and the UL slot proportion.

For example, if the ACKs/NACKs of the M' PDSCH transmissions appear at the time-domain position for ACK/NACK reporting and first time intervals between transmission moments of some PDSCH transmissions and the time-domain position for ACK/NACK reporting are greater than T_max, the UE selects the ACKs/NACKs of the PDSCH transmissions of which first time intervals are not greater than T_max for bundling reporting.

For example, if the ACKs/NACKs of the M' PDSCH transmissions appear at the time-domain position for ACK/NACK reporting and first time intervals between transmission moments of some PDSCH transmissions and the time-domain position for ACK/NACK reporting are greater than T_max or less than T_min, the UE selects the ACKs/NACKs of the PDSCH transmissions of which first time intervals are not greater than T_max and not less than T_min for bundling reporting.

In another embodiment, the first time intervals between the transmission moments of the M PDSCH transmissions and the time-domain position for ACK/NACK reporting are not greater than T_max and/or the first time intervals are not less than T_min, and M is a positive integer not greater than M_max, where T_max, T-min and M_max are configured by the base station through the high-layer signaling or determined according to at least one of factors such as the HARQ process number, the PDSCH and/or ACK/NACK processing delays and the UL slot proportion.

For example, if the ACKs/NACKs of the M' PDSCH transmissions appear at the time-domain position for ACK/NACK reporting and first time intervals between transmission moments of some of the M' PDSCH transmissions and the time-domain position for ACK/NACK reporting are greater than T_max, the UE selects the ACKs/NACKs of M" PDSCH transmissions of which first time intervals are not greater than T_max for bundling reporting. If M">M_max, the UE selects the ACKs/NACKs of M_max PDSCH transmissions in the M" PDSCH transmissions for bundling reporting. For example, the UE selects the ACKs/NACKs of the last M_max PDSCH transmissions in the M" PDSCH transmissions for bundling reporting.

In another embodiment, a difference of a maximum value and minimum value of the first time intervals between the transmission moments of the M PDSCH transmissions and the time-domain position for ACK/NACK reporting is not greater than T_delta, T_delta being configured by the base station through the high-layer signaling or determined according to at least one of factors such as the HARQ process number, the PDSCH and/or ACK/NACK processing delays and the UL slot proportion.

Compared with a conventional art, the embodiment has the technical advantages of adaptability to a flexible frame structure configuration, more flexible number for bundling-based ACK/NACK feedback and adaptability to UE with different HARQ processing capabilities and different UL and DL proportions. The PDSCH transmissions of ACK/NACK reporting are limited, so that channels that the M PDSCH transmissions of ACK/NACK reporting pass through have similar channel characteristics, the ACKs/NACKs of the M PDSCH transmissions are similar, accuracy of the ACKs/NACKs may be improved, and an ACK/NACK overhead may be reduced.

The embodiments of the application also provide an ACK/NACK reporting method, which includes the following steps.

In step 1, UE determines a time-domain position for ACK/NACK reporting of a PDSCH transmission according to signaling sent by a base station.

The time-domain position for ACK/NACK reporting is a first slot or mini-slot, more than or equal to n+k, available for ACK/NACK transmission, n being a last slot or mini-slot where the PDSCH transmission is received and k being a numerical value indicated by the base station through high-layer signaling and/or DL control signaling.

In step 2, the UE performs bundling reporting on ACKs/NACKs of M PDSCH transmissions meeting a limiting condition at the time-domain position for ACK/NACK reporting, M being a positive integer. The ACKs/NACKs of the M PDSCH transmissions are reported at the same time-domain position, or, the ACKs/NACKs of the M PDSCH transmissions are reported at the same time-domain position through the same carrier, or, the ACKs/NACKs of the M PDSCH transmissions are reported at the same time-domain position through the same frequency-domain resource set.

The UE, for each codeword or CBG, executes a logical AND operation on ACKs/NACKs of corresponding codewords or CBGs of multiple PDSCH transmissions to obtain N ACKs/NACKs, N being the number of codewords or CBGs in a PDSCH transmission.

In an implementation process, M meets at least one of the following conditions.
1) M is a positive integer not greater than M_max.
2) First time intervals between transmission moments of the M PDSCH transmissions and the time-domain position for ACK/NACK reporting are not greater than T_max and/or the first time intervals are not less than T_min,
3) A difference of a maximum value and minimum value of the first time intervals between the transmission moments of the M PDSCH transmissions and the time-domain position for ACK/NACK reporting is not greater than T_delta, M_max, T_max, T_min and T_delta are configured by the base station through the high-layer signaling or determined by the UE/network-side device according to at least one of factors such as a HARQ process number, PDSCH and/or ACK/NACK processing delays and a UL slot proportion.

The technical solution provided in the embodiment is adapted to a flexible frame structure configuration, more flexible in number for bundling-based ACK/NACK feedback and adapted to UE with different HARQ processing capabilities and different UL and DL proportions.

Based on the abovementioned embodiments, the embodiments of the application provide an ACK/NACK reporting apparatus. Each unit of the apparatus and each module of each unit may be implemented through a processor of an ACK/NACK reporting device (UE) and, of course, may also be implemented through a logic circuit. In an implementation process, the processor may be a Central Processing Unit (CPU), a Micro Processing Unit (MPU), a Digital Signal Processor (DSP), a Field-Programmable Gate Array (FPGA) or the like.

Figure 5:
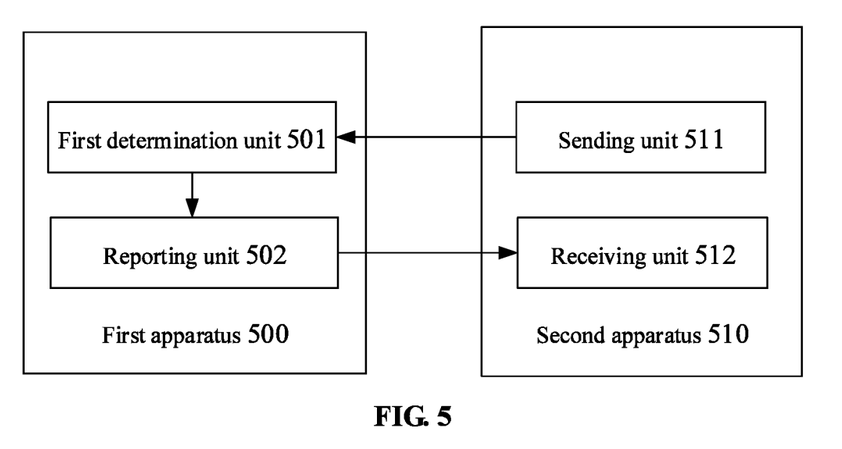
FIG. 5 is a composition structure diagram of an ACK/NACK reporting apparatus according to an embodiment of the application.

FIG. 5 is a composition structure diagram of an ACK/NACK reporting apparatus according to an embodiment of the application. As shown in FIG. 5, the apparatus includes a first apparatus 500 and a second apparatus 510. The first apparatus 500 includes a first determination unit 501 and a reporting unit 502. The second apparatus 510 includes a sending unit 511 and a receiving unit 512.

The sending unit 511 is configured to send signaling to UE, the signaling being configured to determine a time-domain position for ACK/NACK reporting of one or more PDSCH transmissions.

The first determination unit 501 is configured to determine the time-domain position for ACK/NACK reporting of the PDSCH transmission according to the signaling sent by the base station.

For example, the time-domain position for ACK/NACK reporting is an (n+k)th slot, n being a last slot where the PDSCH transmission is received and k is a numerical value indicated by a DCI. If the time-domain position for ACK/NACK reporting of the PDSCH transmission is a resource (for example, a non-UL slot) unavailable for ACK/NACK transmission, the UE does not report any ACK/NACK at the time-domain position. If the time-domain position for ACK/NACK reporting of the PDSCH transmission is a resource (for example, a UL slot) available for ACK/NACK transmission, the UE reports an ACK/NACK of the PDSCH transmission and an unreported ACK/NACK of a PDSCH transmitted in time T before the PDSCH transmission. ACKs/NACKs of multiple PDSCH transmissions may be merged for reporting, namely one ACK/NACK is determined according to the ACKs/NACKs of the multiple PDSCH transmissions for reporting.

The reporting unit 502 is configured to report ACKs/NACKs of M PDSCH transmissions meeting a limiting condition at the time-domain position for ACK/NACK reporting, M being an integer greater than 0.

The receiving unit 512 is configured to receive the ACKs/NACKs reported by the UE, the ACKs/NACKs corresponding to the M PDSCH transmissions meeting the limiting condition.

In another embodiment, the first apparatus further includes a second determination unit 503, configured to determine the limiting condition for PDSCH transmissions of ACK/NACK reporting.

In another embodiment, the limiting condition includes a maximum number M_max of PDSCH transmissions of which ACK/NACKs are reported, and the second determination unit is configured to determine the maximum number M_max of PDSCH transmissions of which ACK/NACKs are reported, M_max being an integer greater than 0.

The reporting unit is configured to report ACKs/NACKs of M PDSCH transmissions of which the number is less than or equal to M_max at the time-domain position for ACK/NACK reporting.

In another embodiment, the apparatus further includes a third determination unit, configured to, if the number M' of PDSCH transmissions requiring ACK/NACK reporting at the time-domain position for ACK/NACK reporting is less than or equal to M_max, determine that the value of M is equal to M' and, if M' is greater than M_max, determine that the value of M is equal to M_max and determine ACKs/NACKs of M_max PDSCH transmissions from ACKs/NACKs of the M' PDSCH transmissions as the ACKs/NACKs of the M PDSCH transmissions.

In another embodiment, the limiting condition includes at least one of a maximum time interval T_max or a minimum time interval T_min, and the reporting unit includes a first determination module and a first reporting module.

The first determination module is configured to determine time intervals between transmission moments of the M' PDSCH transmissions and a moment of the time-domain position for ACK/NACK reporting.

The first reporting module is configured to report the ACKs/NACKs of M PDSCH transmissions of which the time intervals are not greater than T_max, or not less than T_min or not greater than T_max and not less than T_min in M' at the time-domain position for ACK/NACK reporting.

In another embodiment, the limiting condition includes a maximum time interval difference T_delta, and the reporting unit includes a second determination module and a second reporting module.

The second determination module is configured to determine an effective initial moment for PDSCH transmission according to the maximum time interval difference T_delta and the moment of the time-domain position for ACK/NACK reporting.

The second reporting module is configured to report the ACKs/NACKs of M PDSCH transmissions of which the transmission moments are after the effective initial moment in the M' PDSCH transmissions.

In another embodiment, the apparatus further includes a configuration unit, configured to configure M_max, T_max, T_min or T_delta through configuration signaling of the base station; or, a fourth determination unit, configured to determine M_max, T_max, T_min or T_delta through at least one of a HARQ process number, a PDSCH processing delay, an ACK/NACK processing delay, a UL slot proportion or a maximum bit number for ACK/NACK reporting.

In another embodiment, the reporting unit is configured to, for each codeword or CBG, execute a logical AND operation on ACKs/NACKs of corresponding codewords or CBGs of N PDSCH transmissions to obtain N ACKs/NACKs, N being the number of codewords or CBGs in a PDSCH transmission.

Or, the UE divides the M PDSCH transmissions into P groups, and the UE executes the logical AND operation on the ACKs/NACKs of each group of PDSCH transmissions to obtain ACKs/NACKs required to be reported, P being an integer greater than 0 and less than M.

In another embodiment, the first determination unit includes a third determination module, a fourth determination module, a fifth determination module and a sixth determination module.

The third determination module is configured to determine a numerical value k indicated by the signaling sent by the base station.

The fourth determination module is configured to determine a numerical value n of a last slot or mini-slot for the PDSCH transmission.

The fifth determination module is configured to determine a first, more than or equal to n+k, slot or mini-slot available for ACK/NACK reporting.

The sixth determination module is configured to determine the first slot or mini-slot available for ACK/NACK reporting as the time-domain position for ACK/NACK reporting.

In another embodiment, slots or mini-slots available for ACK/NACK reporting include a UL slot, a UL mini-slot, an undetermined slot or undetermined mini-slot and a DL slot except that indicated by dynamic signaling.

In another embodiment, the ACKS/NACKS corresponding to the M PDSCH transmissions are reported at the same time-domain position.

The above descriptions about the apparatus embodiments are similar to descriptions about the method embodiments and beneficial effects similar to those of the method embodiments are achieved. Technical details undisclosed in the apparatus embodiments of the application may be understood with reference to the descriptions about the method embodiments of the application.

It is to be noted that, in the embodiments of the application, when being implemented in form of software function module and sold or used as an independent product, the ACK/NACK reporting method may also be stored in a computer-readable storage medium. Based on such an understanding, the technical solutions of the embodiments of the application substantially or parts making contributions to the conventional art may be embodied in form of software product, and the computer software product is stored in a storage medium, including a plurality of instructions configured to enable UE or a base station to execute all or part of the method in each embodiment of the application. The storage medium includes various media capable of storing program codes such as a U disk, a mobile hard disk, a Read Only Memory (ROM), a magnetic disk or an optical disk. Therefore, the embodiments of the application are not limited to any specific hardware and software combination.

Correspondingly, the embodiments of the application provide an ACK/NACK reporting device, which includes a memory and a processor. The memory stores computer programs capable of running in the processor. The processor executes the programs to implement the steps in the ACK/NACK reporting method.

The embodiments of the application provide a computer-readable storage medium, in which computer programs are stored, the computer programs being executed by a processor to implement the steps in the ACK/NACK reporting method.

The above descriptions about the storage medium and device embodiments are similar to descriptions about the method embodiments and beneficial effects similar to those of the method embodiments are achieved. Technical details undisclosed in the apparatus embodiments of the application may be understood with reference to the descriptions about the storage medium and device embodiments of the application.

Figure 6:
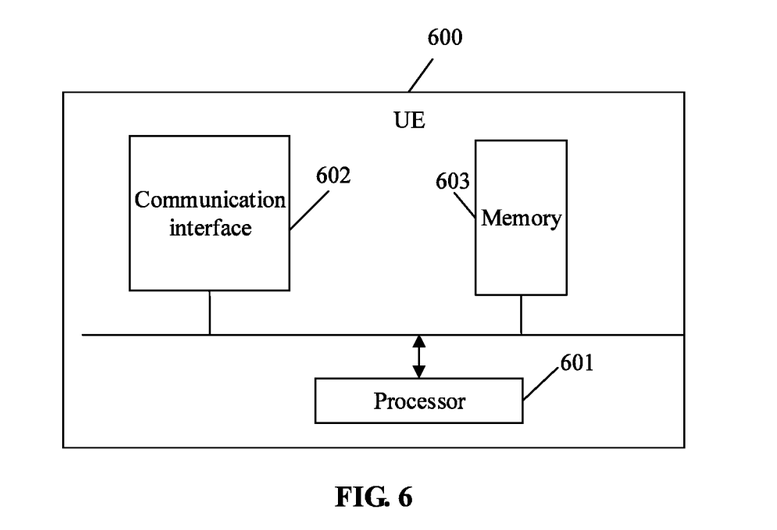
FIG. 6 is a schematic diagram of a hardware entity of UE according to an embodiment of the application.

It is to be noted that FIG. 6 is a schematic diagram of a hardware entity of UE according to an embodiment of the application. As shown in FIG. 6, the hardware entity of the UE 600 includes a processor 601, a communication interface 602 and a memory 603.

The processor 601 usually controls an overall operation of the UE 600.

The communication interface 602 may enable the UE to communicate with other UE or a base station through a network.

The memory 603 is configured to store instructions and applications executable for the processor 601, may also cache data (for example, image data, video data, voice communication data and video communication data) to be processed or having been processed by the processor 601 and each module in the UE 600 and may be implemented through a flash or a Random Access Memory (RAM).

It is to be understood that "one embodiment" and "an embodiment" mentioned in the whole specification mean that specific features, structures or characteristics related to the embodiment is included in at least one embodiment of the application. Therefore, "in one embodiment" or "in an embodiment" appearing at any place of the whole specification does not always refer to the same embodiment. In addition, these specific features, structures or characteristics may be combined in one or more embodiments in any proper manner. It is to be understood that, in various embodiments of the application, a magnitude of a sequence number of each process does not mean an execution sequence and the execution sequence of each process should be determined by its function and an internal logic and should not form any limit to an implementation process of the embodiments of the application. The sequence numbers of the embodiments of the application are adopted not to represent superiority-inferiority of the embodiments but only for description.

It is to be noted that terms "include" and "contain" or any other variant thereof is intended to cover nonexclusive inclusions herein, so that a process, method, object or device including a series of elements not only includes those elements but also includes other elements which are not clearly listed or further includes elements intrinsic to the process, the method, the object or the device. Under the condition of no more limitations, an element defined by the statement "including a/an" does not exclude existence of the same other elements in a process, method, object or device including the element.

In some embodiments provided by the application, it is to be understood that the disclosed device and method may be implemented in another manner. The device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part of all of the units may be selected according to a practical requirement to achieve the purposes of the solutions of the embodiments.

In addition, each function unit in each embodiment of the application may be integrated into a processing unit, each unit may also serve as an independent unit and two or more than two units may also be integrated into a unit. The integrated unit may be implemented in a hardware form and may also be implemented in form of hardware and software function unit.

Those of ordinary skill in the art should know that all or part of the steps of the method embodiment may be implemented by related hardware instructed through a program, the program may be stored in a computer-readable storage medium, and the program is executed to execute the steps of the method embodiment. The storage medium includes: various media capable of storing program codes such as a mobile storage device, a ROM, a magnetic disk or a compact disc.

Or, when being implemented in form of software function module and sold or used as an independent product, the integrated unit of the application may also be stored in a computer-readable storage medium. Based on such an understanding, the technical solutions of the embodiments of the application substantially or parts making contributions to the conventional art may be embodied in form of software product, and the computer software product is stored in a storage medium, including a plurality of instructions configured to enable a computer device (which may be UE) to execute all or part of the method in each embodiment of the application. The storage medium includes: various media capable of storing program codes such as a mobile hard disk, a ROM, a magnetic disk or a compact disc.

The above is only the implementation mode of the application and not intended to limit the scope of protection of the application. Any variations or replacements apparent to those skilled in the art within the technical scope disclosed by the application shall fall within the scope of protection of the application. Therefore, the scope of protection of the application shall be subject to the scope of protection of the claims.

The invention claimed is:

1. An Acknowledgement (ACK)/Negative Acknowledgement (NACK) reporting method, comprising:
determining, by a User Equipment (UE), according to signaling sent by a base station, a time-domain position for ACK/NACK reporting of one or more Physical Downlink Shared Channel (PDSCH) transmissions; and
reporting, by the UE, ACKs/NACKs of M PDSCH transmissions meeting a limiting condition at the time-domain position, M being an integer greater than 0,
wherein determining, by the UE, the time-domain position for ACK/NACK reporting of the PDSCH according to the signaling sent by the base station comprises:
determining a numerical value k indicated by the signaling sent by the base station;
determining a numerical value n of a last slot or mini-slot for the PDSCH transmission;
determining a first, more than or equal to n+k, slot or mini-slot available for ACK/NACK reporting; and
determining the first slot or mini-slot available for ACK/NACK reporting as the time-domain position for ACK/NACK reporting.

2. The method of claim 1, wherein the limiting condition comprises a maximum number M_max of PDSCH transmissions of which ACK/NACK are reported, and
reporting, by the UE, the ACKs/NACKs of the M PDSCH transmissions meeting the limiting condition at the time-domain position comprises:
reporting, by the UE, the ACKs/NACKs of the M PDSCH transmissions at the time-domain position, wherein M is less than or equal to M_max.

3. The method of claim 2, further comprising:
if a number M' of PDSCH transmissions requiring ACK/NACK reporting at the time-domain position is less than or equal to M_max, determining a value of M to be equal to M'; and
if M' is greater than M_max, determining the value of M to be equal to M_max, and determining ACKs/NACKs of M_max PDSCH transmissions from ACKs/NACKs of the M' PDSCH transmissions as the ACKs/NACKs of the M PDSCH transmissions.

4. The method of claim 1, wherein the limiting condition comprises at least one of a maximum time interval T_max or a minimum time interval T_min, and
reporting, by the UE, the ACKs/NACKs of the M PDSCH transmissions meeting the limiting condition at the time-domain position comprises:
determining that time intervals between transmission moments of the M PDSCH transmissions and a moment of the time-domain position for ACK/NACK reporting meet at least one of the following conditions: being not greater than T_max, being not less than T_min, or being not greater than T_max and not less than T_min.

5. The method of claim 1, wherein the limiting condition comprises a maximum time interval difference T_delta, and reporting, by the UE, the ACKs/NACKs of the M PDSCH transmissions meeting the limiting condition at the time-domain position for ACK/NACK reporting comprises:
determining an effective initial moment for PDSCH transmission according to the maximum time interval difference T_delta and a moment of the time-domain position for ACK/NACK reporting; and
reporting the ACKs/NACKs of M PDSCH transmissions of which the PSDCH transmission moments are after the effective initial moment.

6. The method of claim 1, wherein the limiting condition comprises at least one of M_max, T_max, T_min or T-delta; or,
the limiting condition is configured through configuration signaling of the base station; or,
the limiting condition is determined by the UE or a network side through at least one of a Hybrid Automatic Repeat reQuest (HARD) process number, a PDSCH processing delay, an ACK/NACK processing delay, an Uplink (UL) slot proportion or a maximum bit number for ACK/NACK reporting.

7. The method of claim 1, wherein reporting, by the UE, the ACKs/NACKs of the M PDSCH transmissions meeting the limiting condition at the time-domain position comprises:
for each codeword or Code Block Group (CBG), executing, by the UE, a logical AND operation on ACKs/NACKs of codewords or CBGs corresponding to the M PDSCH transmissions to obtain N ACKs/NACKs, N being a number or a maximum number of codewords or CBGs comprised in one PDSCH transmission;
or, dividing, by the UE, the M PDSCH transmissions into P groups, and executing, by the UE, the logical AND operation on the ACKs/NACKs of each group of PDSCH transmissions to obtain ACKs/NACKs required to be reported, P being an integer greater than 0 and less than M.

8. The method of claim 1, wherein slots or mini-slots available for ACK/NACK reporting comprise a UL slot, a UL mini-slot, an undetermined slot or undetermined mini-slot and a Downlink (DL) slot or DL mini-slot except that indicated by dynamic signaling.

9. The method of claim 1, wherein the ACKs/NACKs of the M PDSCH transmissions are reported at a same time-domain position, or,
the ACKs/NACKs of the M PDSCH transmissions are reported at a same time-domain position through a same carrier, or,
the ACKs/NACKs of the M PDSCH transmissions are reported at a same time-domain position through a same frequency-domain resource set.

10. An Acknowledgement (ACK)/Negative Acknowledgement (NACK) receiving method, comprising:
sending, by a base station, signaling to a User Equipment (UE), the signaling being configured to determine a time-domain position for ACK/NACK reporting of one or more Physical Downlink Shared Channel (PDSCH) transmissions; and
receiving, by the base station, ACKs/NACKs reported by the UE, the ACKs/NACKs of M PDSCH transmissions meeting a limiting condition and M being an integer greater than 0, wherein the UE determines a numerical value k indicated by the signaling sent by the base station, determines a numerical value n of a last slot or mini-slot for the PDSCH transmission, determines a first slot or mini-slot available for ACK/NACK reporting, wherein an index of the first slot or mini-slot is greater than or equal to n+k, and determines the first slot or mini-slot available for ACK/NACK reporting as the time-domain position for ACK/NACK reporting.

11. An Acknowledgement (ACK)/Negative Acknowledgement (NACK) reporting device, comprising a memory and a processor, wherein the memory stores computer programs capable of running in the processor, and when the programs are executed by the processor, the processor is configured to:
   determine according to signaling sent by a base station, a time-domain position for ACK/NACK reporting of one or more Physical Downlink Shared Channel (PDSCH) transmissions; and
   report ACKs/NACKs of M PDSCH transmissions meeting a limiting condition at the time-domain position, M being an integer greater than 0,
   wherein the processor is further configured to:
   determine a numerical value k indicated by the signaling sent by the base station;
   determine a numerical value n of a last slot or mini-slot for the PDSCH transmission;
   determine a first, more than or equal to n+k, slot or mini-slot available for ACK/NACK reporting; and
   determine the first slot or mini-slot available for ACK/NACK reporting as the time-domain position for ACK/NACK reporting.

12. The device of claim 11, wherein the limiting condition comprises a maximum number M_max of PDSCH transmissions of which ACK/NACK are reported, and
   the processor is specifically configured to:
   report the ACKs/NACKs of the M PDSCH transmissions at the time-domain position, wherein M is less than or equal to M_max.

13. The device of claim 12, the processor is specifically configured to:
   in response to a number M' of PDSCH transmissions requiring ACK/NACK reporting at the time-domain position being less than or equal to M_max, determine a value of M to be equal to M'; and
   in response to M' being greater than M_max, determine the value of M to be equal to M_max, and determine ACKs/NACKs of M_max PDSCH transmissions from ACKs/NACKs of the M' PDSCH transmissions as the ACKs/NACKs of the M PDSCH transmissions.

14. The device of claim 11, wherein the limiting condition comprises at least one of a maximum time interval T_max or a minimum time interval T_min, and the processor is specifically configured to:
   determine that time intervals between transmission moments of the M PDSCH transmissions and a moment of the time-domain position for ACK/NACK reporting meet at least one of the following conditions: being not greater than T_max, being not less than T_min, or being not greater than T_max and not less than T_min.

15. The device of claim 11, wherein the limiting condition comprises a maximum time interval difference T_delta, and the processor is specifically configured to:
   determine an effective initial moment for PDSCH transmission according to the maximum time interval difference T_delta and a moment of the time-domain position for ACK/NACK reporting; and
   report the ACKs/NACKs of M PDSCH transmissions of which the PSDCH transmission moments are after the effective initial moment.

16. The device of claim 11, wherein the limiting condition comprises at least one of M_max, T_max, T_min or T-delta; or,
   the limiting condition is configured through configuration signaling of the base station; or,
   the limiting condition is determined by a UE or a network side through at least one of a Hybrid Automatic Repeat reQuest (HARD) process number, a PDSCH processing delay, an ACK/NACK processing delay, an Uplink (UL) slot proportion or a maximum bit number for ACK/NACK reporting.

17. The device of claim 11, wherein the processor is specifically configured to:
   for each codeword or Code Block Group (CBG), execute a logical AND operation on ACKs/NACKs of codewords or CBGs corresponding to the M PDSCH transmissions to obtain N ACKs/NACKs, N being a number or a maximum number of codewords or CBGs comprised in one PDSCH transmission;
   or, divide the M PDSCH transmissions into P groups, and execute the logical AND operation on the ACKs/NACKs of each group of PDSCH transmissions to obtain ACKs/NACKs required to be reported, P being an integer greater than 0 and less than M.

18. The device of claim 11, wherein slots or mini-slots available for ACK/NACK reporting comprise a UL slot, a UL mini-slot, an undetermined slot or undetermined mini-slot and a Downlink (DL) slot or DL mini-slot except that indicated by dynamic signaling.

* * * * *